United States Patent [19]
Asquith et al.

[11] Patent Number: 5,617,717
[45] Date of Patent: Apr. 8, 1997

[54] FLAME STABILIZATION SYSTEM FOR AIRCRAFT JET ENGINE AUGMENTOR USING PLASMA PLUME IGNITORS

[75] Inventors: Joseph G. Asquith, Calabasas; William P. Peschel, Venice; Jacob L. Sperling, Carlsbad, all of Calif.

[73] Assignee: Aero-Plasma, Inc., Calabasas, Calif.

[21] Appl. No.: 332,053

[22] Filed: Oct. 31, 1994

Related U.S. Application Data

[63] Continuation-in-part of Ser. No. 222,012, Apr. 4, 1994, Pat. No. 5,442,907, and Ser. No. 258,983, Jun. 13, 1994.

[51] Int. Cl.⁶ ........................................ F02K 3/10
[52] U.S. Cl. .................. 60/39.06; 60/39.821; 60/261; 219/121.48
[58] Field of Search .................. 60/261, 39.141, 60/39.821, 39.06, 39.091, 39.826; 219/121.52, 121.48, 121.54, 121.57, 121.5; 315/111.21, 111.81

[56] References Cited

U.S. PATENT DOCUMENTS

| | | | |
|---|---|---|---|
| 3,366,373 | 1/1968 | Reed | 60/261 |
| 3,800,530 | 4/1974 | Nash | 60/261 |
| 4,302,933 | 12/1981 | Smith | 60/261 |
| 4,609,808 | 9/1986 | Bloyet et al. | 219/121 PR |
| 4,676,907 | 9/1988 | Otani et al. | 219/121.56 |
| 5,257,500 | 11/1993 | Venkatarmani et al. | 60/39.821 |
| 5,385,015 | 1/1995 | Clements et al. | 60/261 |
| 5,414,235 | 5/1995 | Lucas et al. | 219/121.43 |
| 5,442,907 | 8/1995 | Asquith et al. | 60/39.091 |

*Primary Examiner*—Louis J. Casaregola
*Assistant Examiner*—Ted Kim
*Attorney, Agent, or Firm*—Saul Epstein

[57] ABSTRACT

A flame stabilizing system for an augmentor, or a ramjet engine, which utilizes continuously operating microwave powered plasma plume igniters to generate a stable source of ignition for the flowing combustible mixture within the augmentor combustion chamber.

5 Claims, 3 Drawing Sheets

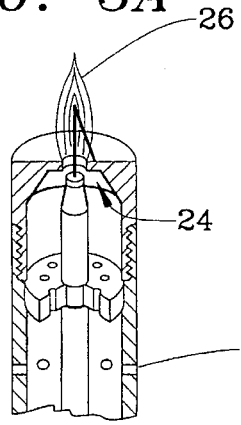
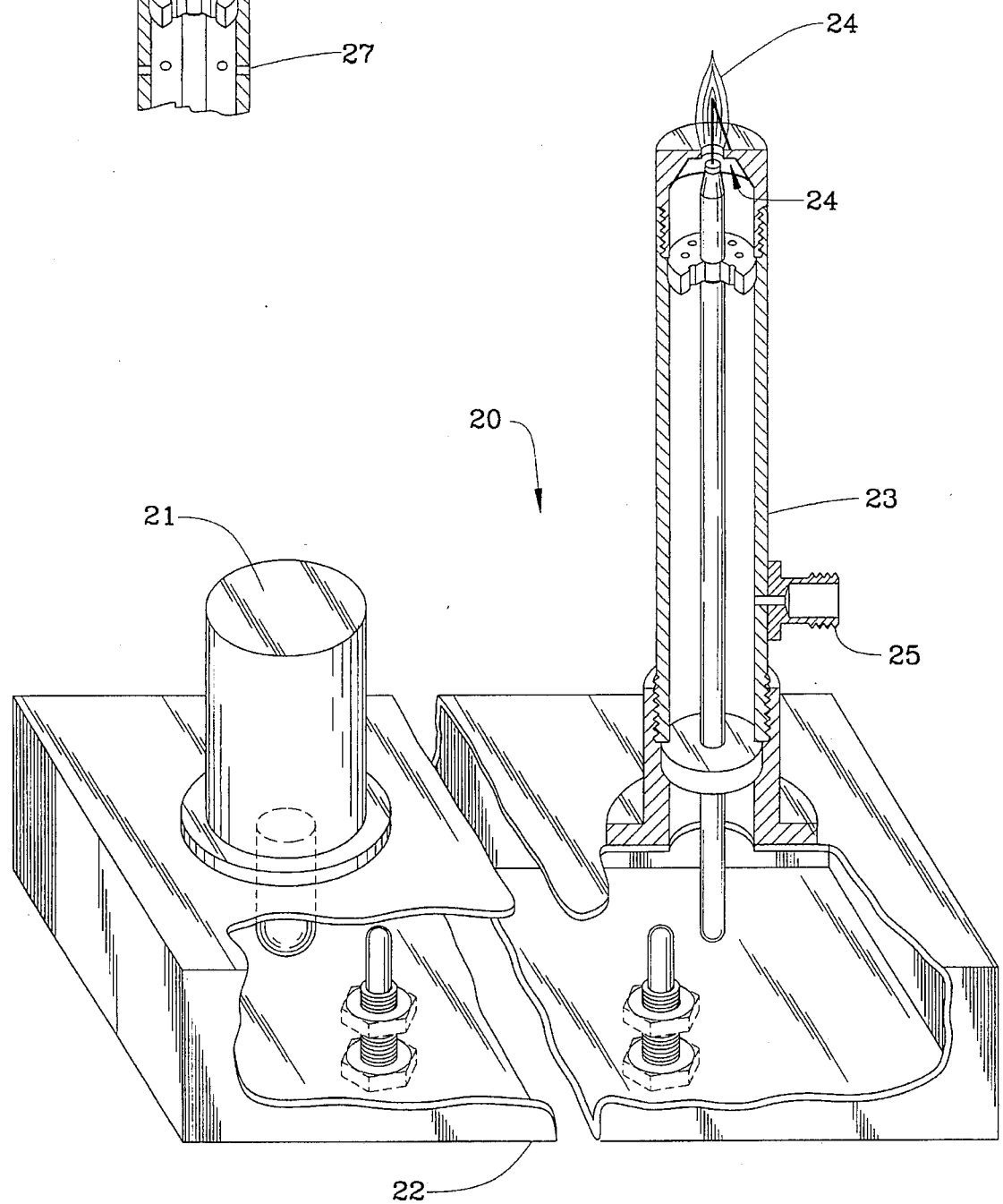

FLAME STABILIZATION SYSTEM FOR AIRCRAFT JET ENGINE AUGMENTOR USING PLASMA PLUME IGNITORS

RELATED APPLICATIONS

This is a continuation-in-part of applications Ser. No. 08/222,012, filed Apr. 4, 1994 now U.S. Pat. No. 5,442,907 and Ser. No. 08/258,983, filed Jun. 13, 1994 which is currently being issued.

BACKGROUND OF THE INVENTION

Many modern jet aircraft, particularly military aircraft, include an augmentor section (popularly called an afterburner) in conjunction with their main propulsion gas turbine engine(s). Augmentors are used primarily to provide extra thrust for relatively short periods of time, which may be required during e.g., takeoff and high speed maneuvers. An augmentor consists basically of a cylindrical section behind the combustor chamber of a gas turbine, where fuel is injected, mixed with the turbine exhaust gases, and burned, so as to create a further expansion of the exhaust gases, increasing their velocity out the rear of the engine. This increase in velocity results, of course, in increased thrust.

When it is desired to commence augmentor operation in current augmentor designs, fuel is injected into the augmentor combustion chamber and ignition is initiated, generally by some type of spark discharge igniter. Since the rate of gas flow through an augmentor is normally much greater than the rate of flame propagation in the flowing gas, some means for stabilizing the flame must be provided, else the flame will simply blow out the rear of the engine, and new fuel being injected will not be ignited. The common means used for flame stabilization consists of placing some type of obstruction in the path of the gas flow to act as a flameholder. Such an obstruction, sometimes called a "bluff body", causes the flow of a portion of the burning gases to be recirculated in some region behind the obstruction. Generally several obstructions are used, spaced around the interior of the augmentor combustion chamber. In the regions where the gas flow is partially recirculated and the velocity is less than the rate of flame propagation, there will be a stable flame existing which can ignite new fuel as it passes. Unfortunately, obstructions in the gas stream inherently cause losses, and the efficiency of the engine thereby drops.

Accordingly, it is an object of the present invention to provide a flame stabilization means which does not involve slowing the gas flow with its attendant loss in efficiency.

SUMMARY OF THE INVENTION

While the present invention is disclosed in the context of a gas turbine augmentor, it will be understood by those skilled in the art that the principles herein described are applicable as well to other types of engines, for example, to ramjet engines. It will be appreciated that a ramjet engine operates in exactly the same manner as does an augmentor, the inlet gas being ram air instead of the exhaust from a turbine. Consequently, references herein to augmentors shall be taken to include ramjet engines.

There are two general types of spark discharge igniters in common use in aircraft jet engines. One type employs a high voltage (several tens of kilovolts) which is discharged across a gap formed between a pair of electrodes in a manner similar to ordinary automobile spark plugs, and the other employs a low voltage (about 2 to 5 kilovolts) in which the discharge takes place along a surface of the igniter between the electrodes. Neither type is suitable for continuous operation.

In one of the copending patent applications by the present inventors referred to above, application Ser. No. 08/258,983, a self starting microwave powered plasma plume igniter was disclosed which is suitable for continuous operation, as required in connection with the present invention. This igniter is capable of injecting a large volume, very high density plasma plume into an augmentor so as to reach regions of combustible fuel/air away from the walls of the augmentor.

Such an igniter is used in the present invention to provide a continuous source of ignition in an augmentor, thereby doing away with the requirement for disrupting the gas flow through the augmentor in order to stabilize the flame.

BRIEF DESCRIPTION OF THE DRAWINGS

FIG. 3 is a partially sectioned view of a microwave powered plasma plume igniter used in connection with the present invention.

FIG. 3A is a fragmentary view of the igniter illustrated in FIG. 3, showing a different way of introducing gas into the igniter.

FIG. 6A is taken at the location 6—6 of FIG. 4.

DETAILED DESCRIPTION OF THE INVENTION

Figure 2:
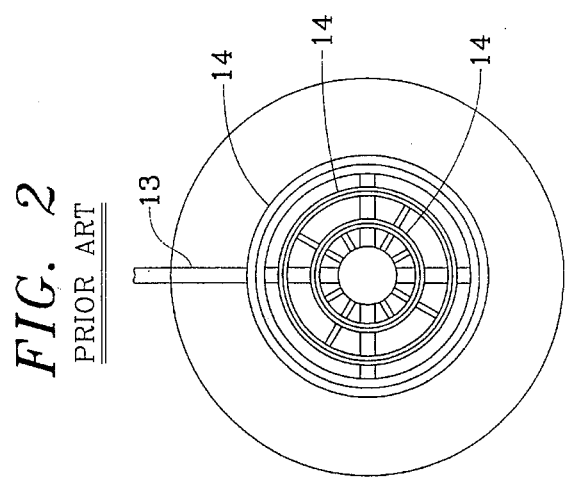
FIG. 2 is a cross sectional view of the augmentor of FIG. 1 taken at 2—2 of FIG. 1.
Figure 1:
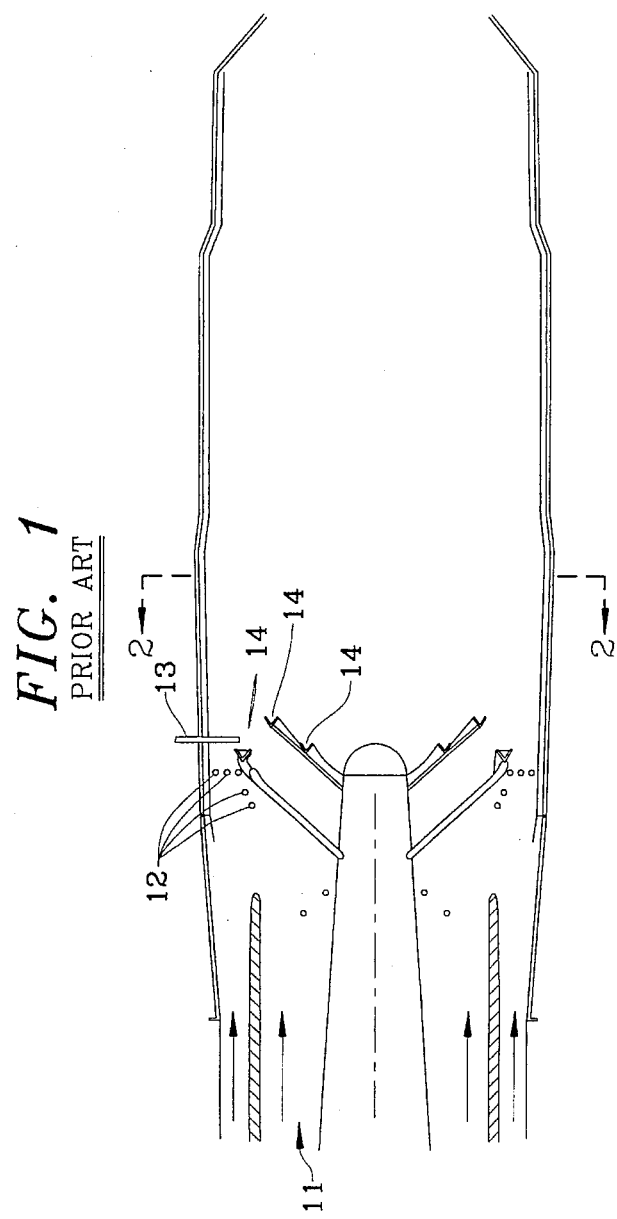
FIG. 1 is a diagrammatic cross sectional side view of a prior art augmentor.

FIGS. 1 and 2 depict a prior art augmentor as would be attached to the exhaust end of an aircraft gas turbine engine. The inlet end 11 of the augmentor accepts the exhaust gas from the engine, which has a substantial unburned air content (i.e., oxygen). The exhaust gas is mixed with fuel entering the augmentor through fuel inlet ports 12 to form a combustible fuel/gas mixture. The combustible fuel/gas mixture flows past obstructions 14 (called "bluff bodies") which are placed in the flow path, and a portion of the flowing gas swirls and eddies behind them, reducing the velocity of the gas stream in this area. A portion of the gas stream reverses flow, resulting in a recirculating fuel/gas mixture which supports the development of stable flame regions downstream of the "bluff body" structures.

At the time the augmentor is started, igniter 13, which is generally of the spark discharge type, is activated to ignite the flowing fuel/gas mixture, and then turned off. Since some of the gas behind the bluff bodies is recirculating, and is continuously being replenished, the ignited region started near the igniter propogates through the radial and ring elements of the bluff body flameholder and a stable flame is created behind them without the necessity of providing a continuous spark. This stable flame ignites the flowing gas stream in the augmentor combustion chamber, which expands to generate the desired thrust.

It will be appreciated that while the flame behind the bluff bodies provides a convenient source of ignition for the flowing gas stream, placing bluff bodies in the flow path causes significant aerodynamic losses, and the efficiency of the augmentor is significantly less than would be desired. The present invention allows the augmentor flame to be stabilized without introducing aerodynamic losses into the system.

FIG. 3 is a partially cut away view of a self-starting microwave powered plasma plume igniter as described in the copending applications referred to above. This igniter is capable of continuously injecting a high energy content plasma plume into an augmentor combustion chamber to continuously ignite the passing fuel/air mixture thus providing a continuous expanding stabilizing flame which ignites the balance of the high velocity combustible gasses flowing through the augmentor. Without going into great detail, which can be obtained by referring particularly to copending application Ser. No. 08/258,983, the igniter 20 is powered by a magnetron 21, the energy from which is coupled into waveguide 22 and thence into a coaxial transmission line 23. The coaxial transmission line 23 terminates in a gap 24 across which a plasma is developed. Air flow through the coaxial transmission line (introduced, in one embodiment, through fitting 25) projects the plasma out into a plume 26.

Figure 5:
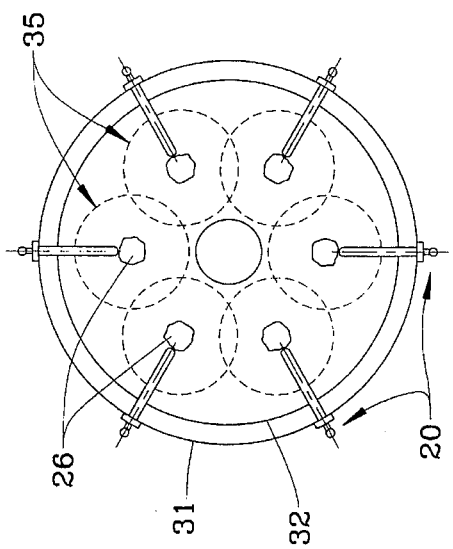
FIG. 5 is a cross sectional view of the augmentor of FIG. 4, taken at 5—5 of FIG. 4.
Figure 4:
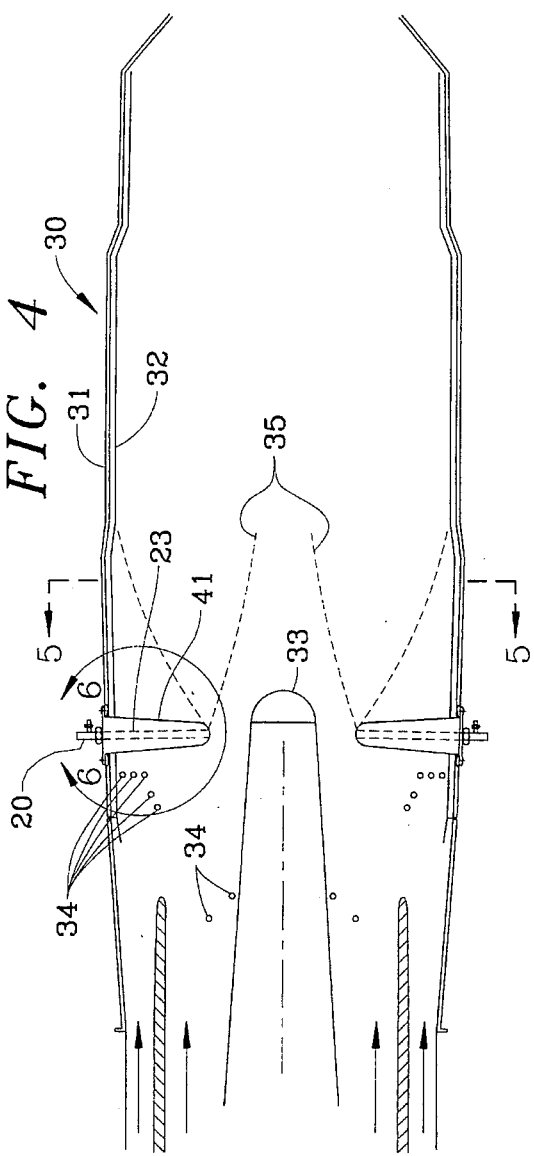
FIG. 4 is a diagrammatic cross sectional side view of an augmentor embodying the present invention.
Figure 7:
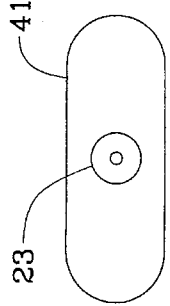
FIG. 7 is a cross sectional view of the igniter of FIG. 6, taken at 7—7 of FIG. 6.

FIGS. 4 and 5 show an augmentor combustion chamber with flame stabilization achieved by the use of continuously operating microwave powered plasma plume igniters 20, to establish a continuously ignited flame region which is a stabilization region in accordance with the present invention, instead of using bluff bodies or other means for locally recirculating the airstream to stabilize the flame. In this embodiment, the plasma plume igniters are integrated into an aerodynamic strut which permits locating the flame-stabilizing plasma plume further away from the inner liner of the combustion chamber, therefore taking advantage of the combustion flame plume spreading toward the liner, thus minimizing the number of plasma plume igniters required and/or shortening the augmentor length. The main structural elements of the augmentor 30 as shown in FIG. 4 are an outer shell 31, and an inner liner 32. The end of the turbine rotor fairing 33, at the inlet end of the augmentor, can also be seen in FIG. 4. Fuel is introduced into the augmentor through fuel spray sources 34 spaced around the periphery of the augmentor interior. Fourteen fuel spray sources 34 can be seen in FIG. 4.

Figure 6A:
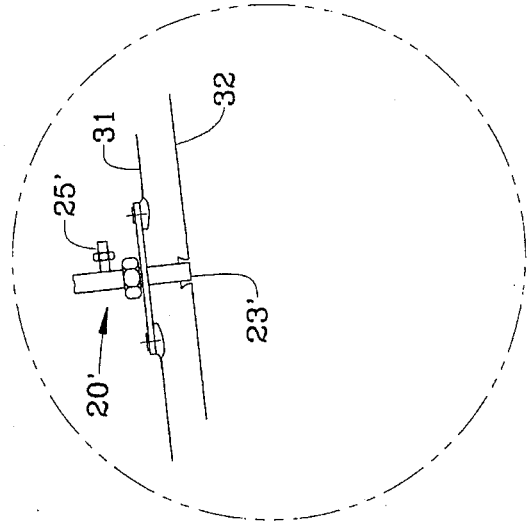
FIG. 6A is a view similar to FIG. 6, but shows a different igniter installation.
Figure 6:
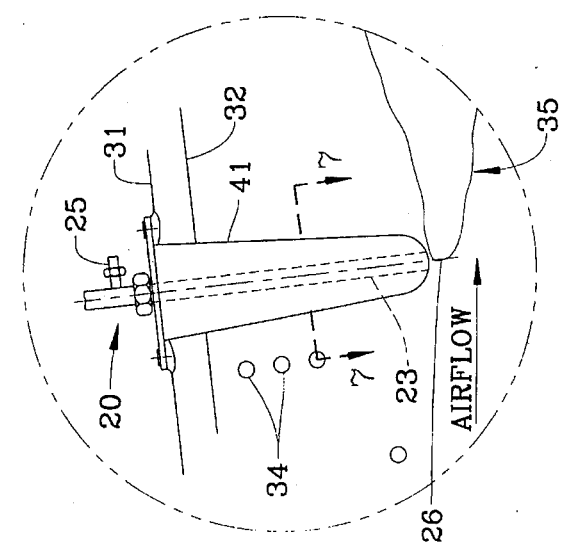
FIG. 6 is an enlarged view of a portion of FIG. 4 showing the igniter installation in more detail, taken at 6—6 of FIG. 4.

A plurality of igniters 20 are spaced around the periphery of the augmentor with their plasma forming ends preferably inserted well into the augmentor combustion chamber, as can be seen in FIG. 6. A streamlined fairing 41 surrounds each igniter to reduce drag, and air or other suitable gas to project the plasma plume into the augmentor combustion chamber is supplied through a fitting 25. Dotted lines 35 depict the outlines of the burning gases as they flow through the augmentor after having been ignited by the igniters 20. It will be appreciated that since the igniters 20 are operated in a continuous mode, the flame in the augmentor is continuously maintained, and no bluff bodies or other means to slow the gas flow are required in order to stabilize the flame.

Fragmentary view FIG. 6A, taken at the same location as FIG. 6, illustrates a different igniter installation. In FIG. 6A, an igniter 20' can be seen installed with its face substantially flush with the inner liner 32 of the augmentor chamber instead of being inserted deep into the chamber. Since the bodies of the igniters 20' are not in the gas flow, there need be no streamlined fairing to reduce drag. While this second embodiment has the advantage of reduced drag, a larger number of igniters will usually be required to maintain a suitable spacing between the igniters on the periphery, and the augmentor will generally be longer, since the flame plumes must spread farther to reach the central axis of the augmentor.

An alternate embodiment of the igniters 20, shown in FIG. 3A, may be used installed either as illustrated in FIG. 6 or in FIG. 6A. In an installation including igniters as illustrated in FIG. 3A, the plasma is projected out into the combustion chamber using the cooling air which exists between the outer shell 31 of the augmentor and inner liner 32 instead of using an external source of air as previously described. The cooling air between the outer shell and the inner liner is always kept at a higher pressure than the pressure in the combustion chamber, and therefore can be used to project the plasma into the combustion chamber. In the igniter illustrated in FIG. 3A, no fitting 25 is used, but rather, a series Of holes 27 are provided in the outer conductor of the coaxial transmission line to allow air flow. The holes 27 are positioned such that, when the igniter is installed, they communicate with the region between the outer shell and the inner liner. When the augmentor is operating, therefore, air will flow into holes 27 and project the plasma out into the combustion chamber.

During normal flight operations, the augmentor is idle, and no fuel is provided, nor are the igniters 20 active. When extra thrust is required, fuel flow through spray sources 34 is initiated and power is provide to igniters 20, resulting in plasma plumes being created in the augmentor combustion chamber. As the fuel, mixed with the main engine exhaust gas passes the plasma plumes, the mixture is ignited, and the gas expands. Since the plasma plumes are continuous, the incoming fuel/gas mixture is continuously ignited, and the flame thereby stabilized.

What has been invented iS a system for providing a stabilized flame in an aircraft jet engine augmentor, or in a ramjet engine, which does not depend on slowing the gas stream to avoid the flame being extinguished. Since slowing the gas stream to stabilize the flame as done in prior art stabilization systems unavoidably dissipates energy, the invented system is inherently more efficient. Various modifications of the presently preferred system described in this specification will no doubt occur to those skilled in the art, and such modifications are intended to be covered by the following claims.

We claim:

1. In an aircraft jet engine augmentor which has an outer shell, and an inner liner spaced from said outer shell which forms the exterior of a augmenter combustion chamber, with oxygen containing gas flowing through said combustion chamber, and means for introducing fuel into said combustion chamber which mixes with said oxygen containing gas to form a flowing combustible fuel/gas mixture flowing at a velocity greater than the velocity with which flame propagates in said fuel/gas mixture, the improvement which comprises a flame stabilizing means for stabilizing flame in said flowing combustible fuel/gas mixture consisting of:

a plurality of continuously operating microwave powered plasma plume igniters projecting through said inner liner into said augmenter combustion chamber wherein the plasma plumes generated by said igniters are immersed in said flowing combustible fuel/gas mixture, providing continuous ignition of said flowing combustible fuel/gas mixture.

2. An improvement for an augmentor as recited in claim 1, and further including a streamlined fairing surrounding said igniters within said augmentor combustion chamber whereby drag is reduced.

3. An improvement for an augmentor as recited in claim 1, wherein said igniters are mounted substantially flush with the inner liner of said augmentor combustion chamber in such manner that said plasma plumes project into said augmentor combustion chamber.

4. An improvement for an augmentor as recited in claim 1, and further including means for introducing gas at a higher pressure than exists in said augmenter combustion chamber into said igniters to cause the plasma plumes generated by said igniters to be projected into said augmenter combustion chamber.

5. An improvement for an augmentor as recited in claim 4, wherein said means for introducing gas utilizes air from between said outer shell and said inner liner to cause said plasma plumes to project into said combustion chamber.

* * * * *